No. 766,811. PATENTED AUG. 9, 1904.
W. F. COGAN.
PORTABLE AUTOMATIC BOAT LEAK DETECTOR.
APPLICATION FILED NOV. 17, 1903.
NO MODEL.
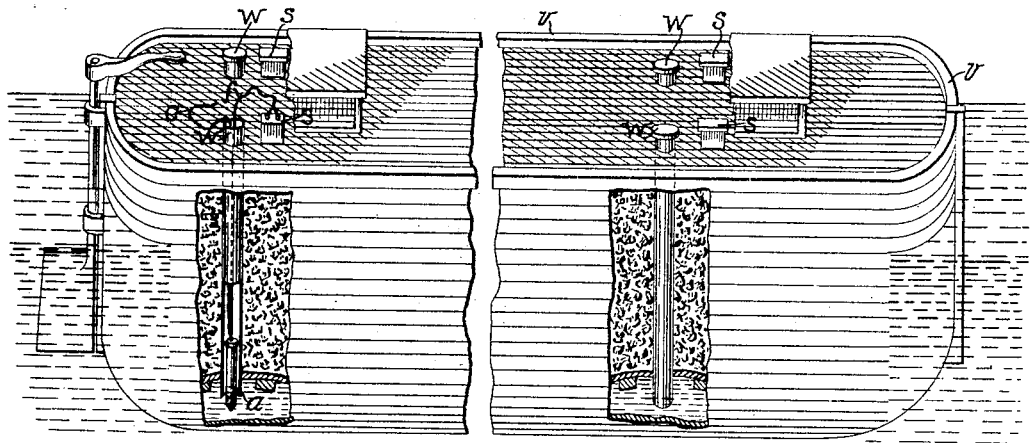
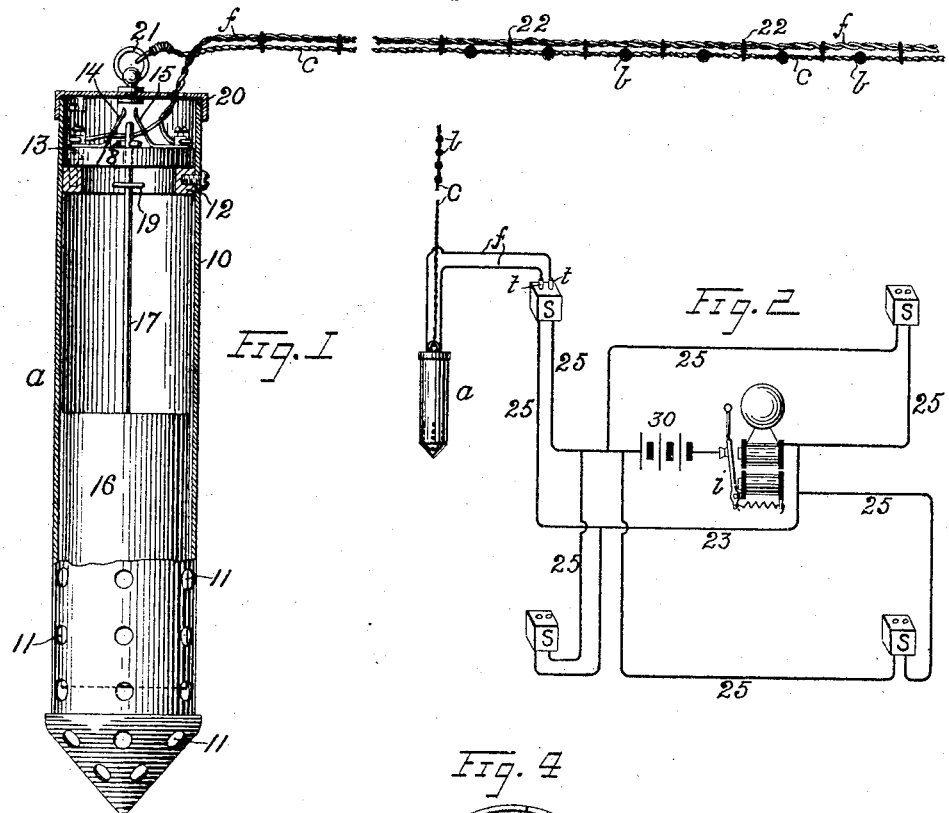
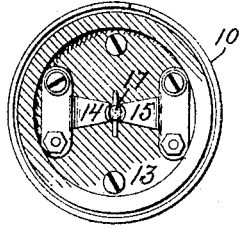
WITNESSES:
Alice M. Gallagher
Sidney W. Mann
INVENTOR
William F. Cogan,
BY W. B. Vansize,
ATTORNEY.

No. 766,811. Patented August 9, 1904.

UNITED STATES PATENT OFFICE.

WILLIAM F. COGAN, OF HOBOKEN, NEW JERSEY.

PORTABLE AUTOMATIC BOAT-LEAK DETECTOR.

SPECIFICATION forming part of Letters Patent No. 766,811, dated August 9, 1904.

Application filed November 17, 1903. Serial No. 181,469. (No model.)

*To all whom it may concern:*

Be it known that I, WILLIAM F. COGAN, a citizen of the United States, and a resident of Hoboken, Hudson county, New Jersey, have invented a new and useful Portable Automatic Boat-Leak Detector, of which the following is a specification.

My invention relates to improvements in portable automatic boat-leak detectors in which an automatic electric-circuit closer operates in conjunction with an electrical indicator and its circuit; and the object of my improvement is, first, to enable the watchman or officer in charge of the boat or vessel to determine the distance between the surface of any water there may be in the hold of the boat or vessel and a point above it, such as the main or other deck; second, to provide for determining the distance between the main or other deck and the surface of the leak-water at various test-points in the vessel—such as the fore end, the stern end, and the same on either side of the vessel—so that in unloading a cargo where the vessel is off an even keel or lists by reason of unequal distribution of the remaining cargo or load the depth of water fore or aft or on either side may be determined by measuring the distance between the deck and the surface of such water; third, to provide a portable leak-detector having an automatic circuit-closer, means for including it in an indicator-circuit, and means for determining or measuring the distance between the deck or point of observation and the surface of the water.

Heretofore and prior to my invention automatic electric indicators have been fixed in position where the mere presence of water would be indicated; but such prior devices were useless and entirely incapable of accomplishing the purpose of my improved apparatus.

The accompanying drawings illustrate my invention.

Figure 1 shows the circuit-closer and the flexible suspending device graduated and marked in linear measure. Fig. 2 shows the indicator-circuit and indicator with means for connecting the circuit-closer at separated points into said circuit. Fig. 3 shows the boat or vessel, the side broken away to expose the cargo, and the fixed tubes or passages at separated points through which the circuit-closer may be freely passed to the hold or surface of the water; and Fig. 4 is a top plan view of the circuit-closer with its cover removed.

The circuit-closer $a$ consists of a tube or cylinder 10, preferably of metal, like brass, perforated near its lower end, as at 11. Near the upper end a ring 12 is fixed upon the interior and supports a base 13, of insulating material, to which are fixed two electrical contact-points 14 and 15. A float 16, of cork or some light material, fits the interior of tube 10. The float supports a rod 17, which passes through the base 13, so that rod 17 can reciprocate or rise and fall. The upper end of rod 17 makes electrical contact with contacts 14 and 15 and closes the circuit in which they are or may be included. There are limits to the rise and fall of rod 17 in the form of pins or metal collars 18 and 19, which are upon opposite sides of the base 13 and are fixed to rod 17. There is a cap 20 fixed upon the upper end of tube 10 by a screw-thread or a bayonet-joint. There is also a ring 21 fixed to cap 20, and a flexible cord, wire, or chain $c$ is fastened to this ring 21. The cord or chain $c$ has fixed at intervals of, say, one foot a series of marks, or preferably devices like the balls $b$, perceptible in the dark. The circuit-closer $a$ is suspended from and by this device $c$, and the distance between a fixed point and the circuit-closer $a$ may be and is determined by the number of marks or balls $b$ passing through the hands of the observer. A flexible cord $f$, having two insulated wires or conductors respectively connected to the contacts 14 and 15, is also provided. This may be mechanically connected to the suspending device $c$ or not, as preferred, by means of ties, like 22. The free end of cord $f$ is provided with suitable connecting devices or plug-tips, like $t$, fitting a connecting device or socket, like $s$, a series of which are electrically connected to the indicator-circuit 23. This circuit includes an indicator $i$ in the form of a vibrating electromagnetic bell, preferably located in the cabin of the vessel or in a watchman's house on the dock, and a battery 30. I have shown four of these switch-sockets s, each connected with the indicator-circuit 23 by branch wires 25 at opposite sides, respectively, of the bell and battery.

The boat or vessel v, Fig. 3, is shown loaded with coal. There are four tubes or passages w, two on each side, two forward and two aft, and in close proximity to each passage w is a socket s, connected with the indicator-circuit. The tubes or passages w extend from a point at or near the deck to a point in the hold at or near the bottom. Both ends are preferably open and free, though the bottoms of w may be perforated only to admit water. This provides free passage for the circuit-closer a and its measuring device c through the cargo.

The operation is as follows: The watchman or officer in charge carries a portable circuit-closer a to each tube or passage w, successively, at each point connecting the cord f into the adjacent socket s, and suspending the device a by the cord c allows the circuit-closer a to descend by gravity through the passage w. He counts the number of marking devices b that pass through his hands as the device a descends, and when the indicator i rings by reason of the fact that the water in the hold has raised the float 16 and closed the circuit at 14 15 18 he determines the distance between the deck and surface of the water and makes record of it, then passing to the next tube w, and repeating the operation at each point in succession.

The employment of a series of passages w at different fixed points enables the watchman or officer to determine when the cargo has been unequally unloaded or unequally distributed and the water by reason of this fact has accumulated at any particular point or section of the vessel.

The described circuit-closer with its flexible suspending device can be tested at intervals by dropping the circuit-closer into a pail of water or into the body of water in which the vessel floats, its portable character rendering this treatment or test practicable.

What I claim, and desire to secure by Letters Patent, is—

1. The combination of a boat or vessel consisting of a suitable hull; a deck therefor; a watchman's station on said deck; an electric indicator-circuit; an indicator in said circuit at said watchman's station; a fixed tube or passage extending vertically from said deck to a point in the hold near the bottom; a portable, perforated, tubular section movable within said tube or passage; insulated electrical contact-points fixed at the upper end of said section; a movable circuit-closer within said section; a float upon which said circuit-closer is supported; a flexible suspending device for said section, marked by divisions representing linear measure; and means for separably connecting the contact-points in said section with the indicator-circuit near the upper end of the tube or passage.

2. In a portable, automatic boat-leak detector, the combination of a perforated sheet-metal tube-section; exposed, insulated, electrical contact-points fixed within said section, a movable circuit-closer within said section, a float upon which said circuit-closer is supported, a flexible suspending device for said section marked by divisions representing linear measure, and a suitable circuit including an indicating device and said circuit-closing points.

3. In a portable, automatic boat-leak detector, the combination of a perforated tube-section, circuit-closing points fixed in said section, a movable circuit-closer, a float within said section upon which said circuit-closer is supported, a flexible suspending device attached to said section marked by divisions representing linear measure, said marks being in the form of projections from the surface, perceptible to the sense of touch.

4. In a portable, automatic boat-leak detector, in combination, a portable, perforated, tubular section; exposed, insulated, electrical contact-points fixed to the interior of said section, a movable circuit-closer within said section, a float upon which said circuit-closer is supported, a cap movably attached to said section, a flexible suspending device connected to said cap, a series of indicating devices perceptible to the sense of touch fixed at regular intervals upon said flexible suspending device, and a suitable indicating-circuit to which said circuit-closing points are connected.

5. In a portable, automatic boat-leak detector, in combination, a portable, perforated, tubular section of sheet metal; exposed, insulated, electrical contact-points fixed to a plate of insulating material located at the upper end of said section, a float within said section, a rod carried by said float passing through said plate, a circuit-closer fixed to said rod, a suspending-cord connected to said section, a series of indicating devices located upon the surface of said cord at regular intervals, a suitable indicating-circuit and means for connecting said circuit-closing points with said circuit.

WILLIAM F. COGAN

Witnesses:
  THEODORE L. CUYLER, Jr.,
  W. B. VANSIZE.